United States Patent
Chow et al.

(10) Patent No.: US 10,235,502 B2
(45) Date of Patent: *Mar. 19, 2019

(54) APPARATUS AND METHOD FOR PROTECTING MEDIA CONTENT RIGHTS

(71) Applicant: AT&T INTELLECTUAL PROPERTY I, LP, Atlanta, GA (US)

(72) Inventors: Lee Chow, Naperville, IL (US); David Piepenbrink, Denver, CO (US); James Sofos, Aurora, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 409 days.

This patent is subject to a terminal disclaimer.

(21) Appl. No.: 15/052,180

(22) Filed: Feb. 24, 2016

(65) Prior Publication Data

US 2016/0171188 A1    Jun. 16, 2016

Related U.S. Application Data

(63) Continuation of application No. 12/265,237, filed on Nov. 5, 2008, now Pat. No. 9,300,667.

(51) Int. Cl.
*G06F 21/00* (2013.01)
*G06F 21/10* (2013.01)
(Continued)

(52) U.S. Cl.
CPC .............. *G06F 21/10* (2013.01); *H04L 63/10* (2013.01); *H04N 21/2225* (2013.01);
(Continued)

(58) Field of Classification Search
CPC ...................................................... G06F 21/00
See application file for complete search history.

(56) References Cited

U.S. PATENT DOCUMENTS

2002/0069420 A1* 6/2002 Russell ................. G06F 21/10
725/92
2003/0097661 A1   5/2003 Li et al.
(Continued)

FOREIGN PATENT DOCUMENTS

JP     2004040772 A  *  2/2004  ............. G06F 21/10
JP     2004040772 A  *  2/2004

OTHER PUBLICATIONS

Greenwald. The Best Ways to Stream Your Media. (Mar. 4, 2011). Retrieved online Nov. 1, 2018. https://www.pcmag.com/article2/0,2817,2380533,00.asp (Year: 2011).*

*Primary Examiner* — James A Reagan
(74) *Attorney, Agent, or Firm* — Guntin & Gust, PLC; Jay Anderson

(57) ABSTRACT

A system that incorporates teachings of the present disclosure may include, for example, a server having a controller to maintain content rights parameters associated with media content and a user where the content rights parameters include limits to distribution of the media content to a plurality of communication devices associated with the user and where a portion of the plurality of communication devices use different communication protocols from another portion of the plurality of communication devices, monitor for access to the media content by one communication device of the plurality of communication devices of the user, and obtain rights control data that is adapted to allow for presentation of the media content by the one communication device of the user where the rights control data is generated based on the content rights parameters. Other embodiments are disclosed.

20 Claims, 9 Drawing Sheets

(51) Int. Cl.
*H04L 29/06* (2006.01)
*H04N 21/2225* (2011.01)
*H04N 21/438* (2011.01)
*H04N 21/472* (2011.01)
*H04N 21/6405* (2011.01)
*H04N 21/643* (2011.01)
*H04N 21/8355* (2011.01)

(52) U.S. Cl.
CPC ... *H04N 21/4383* (2013.01); *H04N 21/47202* (2013.01); *H04N 21/6405* (2013.01); *H04N 21/64322* (2013.01); *H04N 21/8355* (2013.01); *G06F 2221/2101* (2013.01); *H04L 2463/101* (2013.01)

(56) References Cited

U.S. PATENT DOCUMENTS

| | | | |
|---|---|---|---|
| 2005/0149450 A1* | 7/2005 | Stefik | G06F 21/10 705/58 |
| 2007/0233582 A1* | 10/2007 | Abhyanker | G06Q 10/087 705/28 |
| 2008/0071617 A1 | 3/2008 | Ware | |
| 2008/0086569 A1 | 4/2008 | Arora et al. | |

* cited by examiner

400

500

600

US 10,235,502 B2

APPARATUS AND METHOD FOR PROTECTING MEDIA CONTENT RIGHTS

CROSS-REFERENCE TO RELATED APPLICATIONS

This application is a continuation of U.S. application Ser. No. 12/265,237, filed Nov. 5, 2008, which is incorporated herein by reference in its entirety.

FIELD OF THE DISCLOSURE

The present disclosure relates generally to communication systems and more specifically to an apparatus and method for protecting media content rights.

BACKGROUND

Networks are continuously expanding their abilities to distribute media content to users, as well as their capabilities for presentation of the media content. Users often have multiple devices for presenting the media content, which can include fixed devices and mobile devices. These devices can operate using a number of different communication protocols and often can receive a variety of formats of the media content.

DETAILED DESCRIPTION

Figure 1:
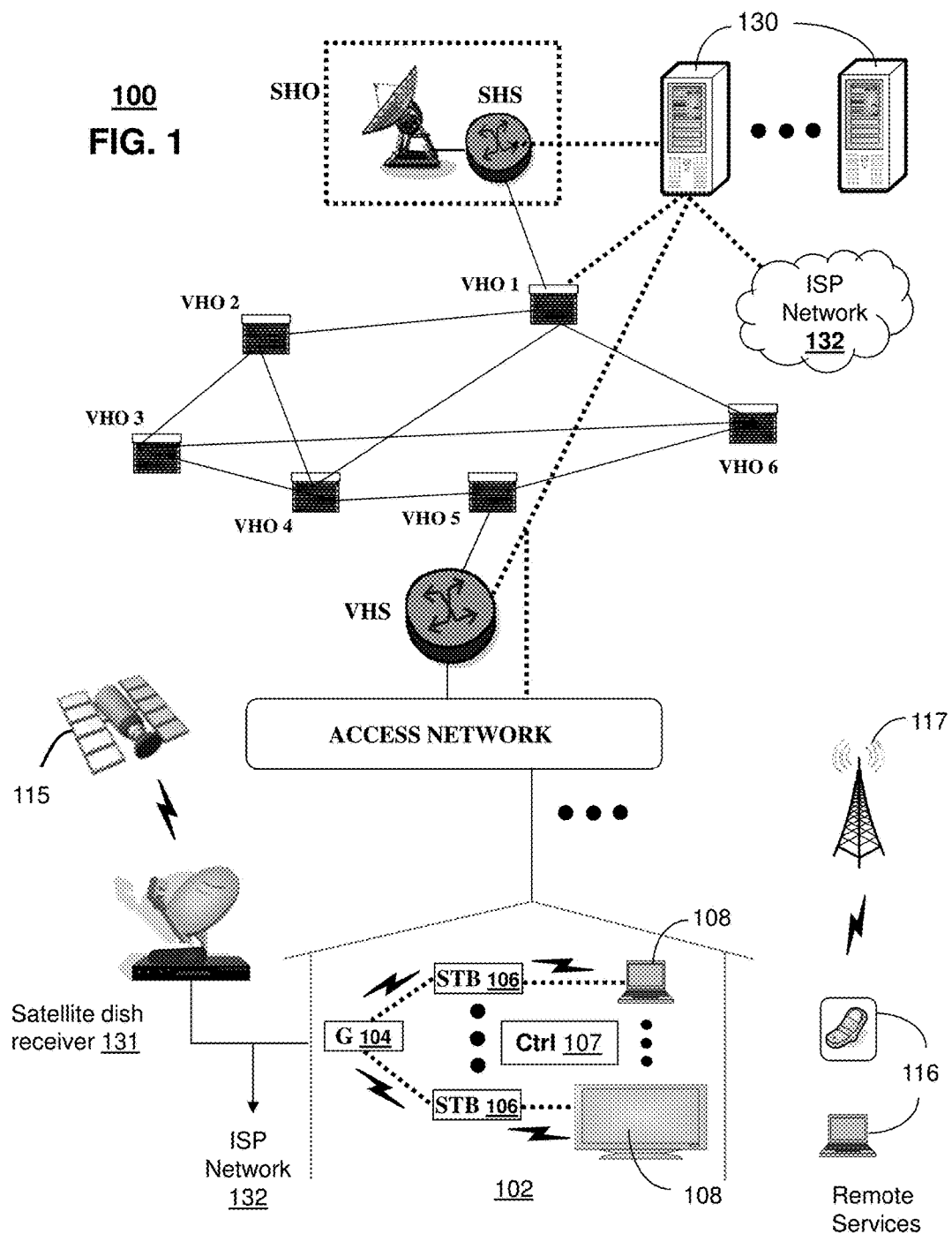
FIGS. 1-4 depict illustrative embodiments of communication systems that provide media services.

One embodiment of the present disclosure can entail a computer-readable storage medium. The storage medium can include computer instructions for monitoring for media content that is distributable where the media content is adapted for distribution to a plurality of communication devices that are associated with a user and where a portion of the plurality of communication devices use different communication protocols from another portion of the plurality of communication devices, maintain content rights parameters associated with the media content and the user where the content rights parameters include limits to the distribution of the media content to the plurality of communication devices of the user, monitoring for access to the media content by one communication device of the plurality of communication devices of the user, determining presentation rights for a presentation of the media content by the one communication device based on the content rights parameters, and transmitting rights control data from the rights management server to the one communication device where the rights control data is generated based on the presentation rights and is adapted to allow for presentation of the media content by the one communication device of the user.

Another embodiment of the present disclosure can entail a server having a controller to maintain content rights parameters associated with media content and a user where the content rights parameters include limits to distribution of the media content to a plurality of communication devices associated with the user and where a portion of the plurality of communication devices use different communication protocols from another portion of the plurality of communication devices, monitor for access to the media content by one communication device of the plurality of communication devices of the user, and obtain rights control data that is adapted to allow for presentation of the media content by the one communication device of the user where the rights control data is generated based on the content rights parameters.

Yet another embodiment of the present disclosure can entail a server having a controller to maintain content rights parameters associated with media content and a user where the content rights parameters include limits to distribution of the media content to a plurality of communication devices associated with the user and where a portion of the plurality of communication devices using different communication protocols from another portion of the plurality of communication devices, generate rights control data based on the content rights parameters that is adapted to allow for presentation of the media content by a target communication device of the plurality of communication devices of the user where the target communication device is seeking access to the media content, and transmit the rights control data to the target communication device.

Yet another embodiment of the present disclosure can entail a server having a controller to monitor for media content that is distributable where the media content is adapted for distribution to a plurality of communication devices that are associated with a user and where a portion of the plurality of communication devices uses different communication protocols from another portion of the plurality of communication devices, maintain content rights parameters associated with the media content and the user where the content rights parameters includes limits to the distribution of the media content to the plurality of communication devices of the user based on a type of communication protocol used by the plurality of communication devices, monitor for access to the media content by one communication device of the plurality of communication devices of the user, generate rights control data based on the content rights parameters that is adapted to allow for presentation of the media content by the one communication device of the plurality of communication devices of the user, and transmit the rights control data to the one communication device.

Yet another embodiment of the present disclosure can entail a method including maintaining content rights parameters associated with media content and a user where the content rights parameters includes limits to distribution of the media content to a plurality of communication devices associated with the user and where a portion of the plurality of communication devices uses different communication protocols from another portion of the plurality of communication devices, monitoring for access to the media content by one communication device of the plurality of communication devices of the user, obtaining rights control data that is adapted to allow for presentation of the media content by the one communication device of the user where the rights control data being generated based on the content rights parameters, and transmitting the rights control data to the one communication device of the user.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
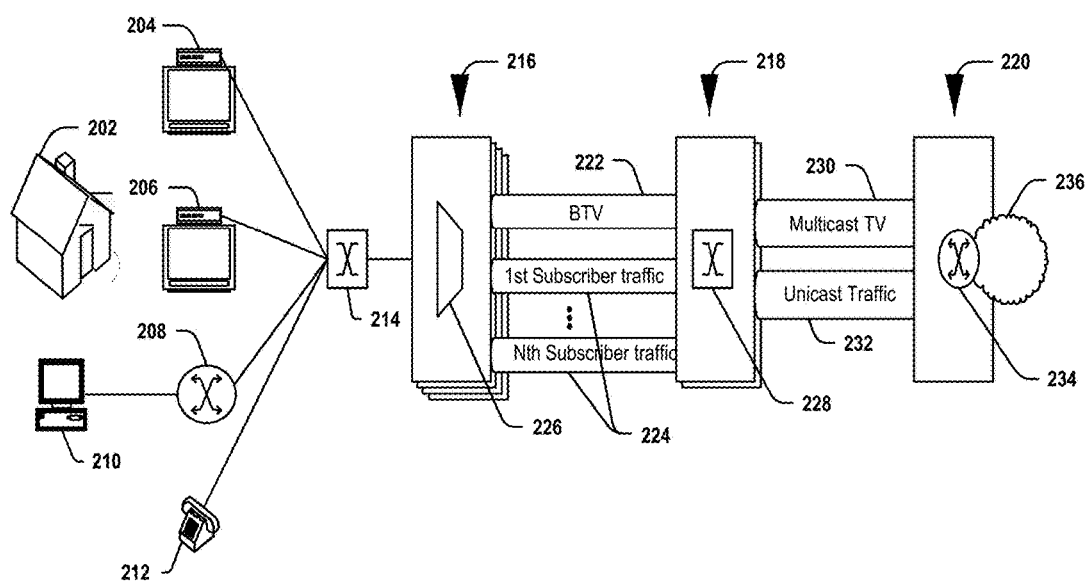

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
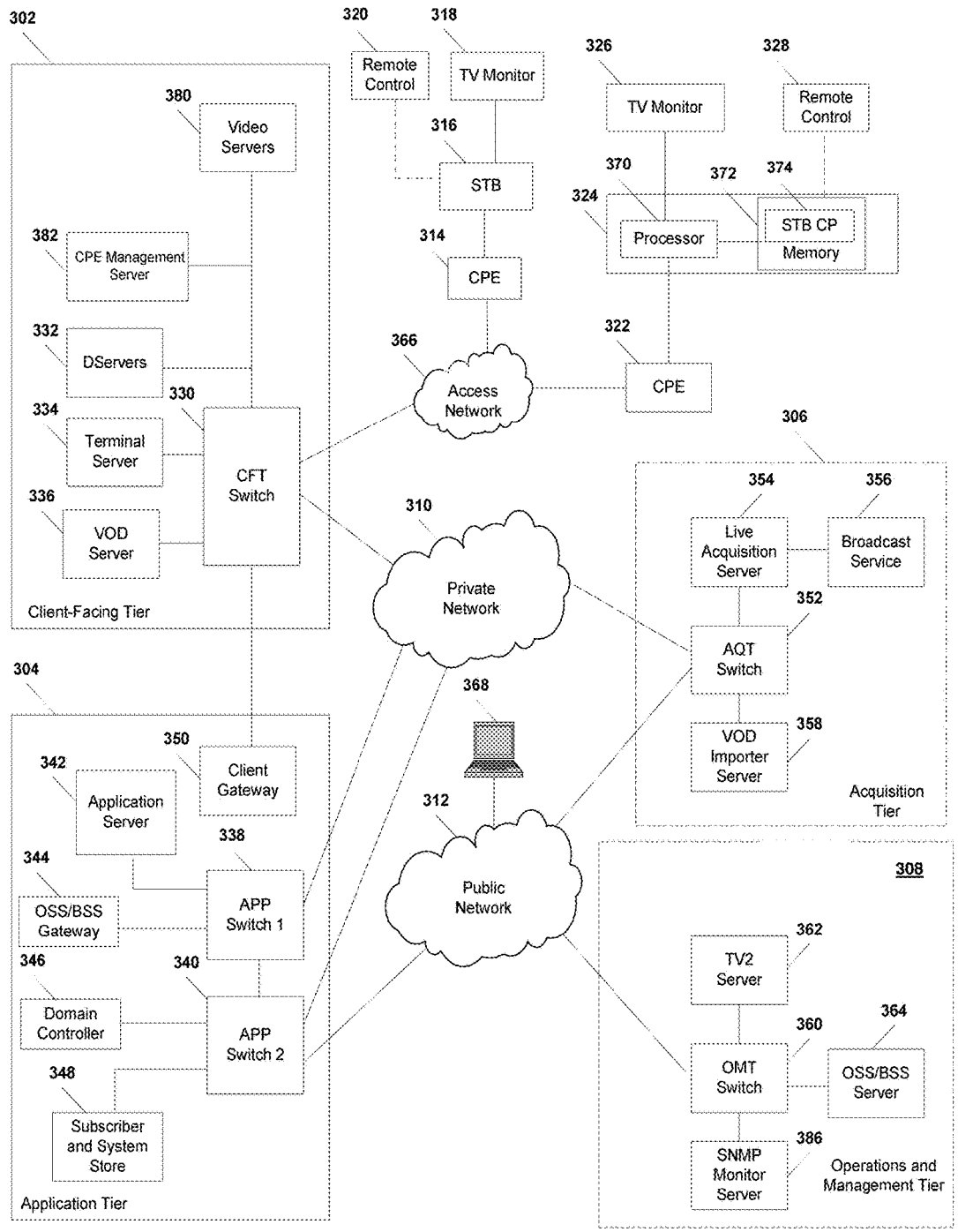

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
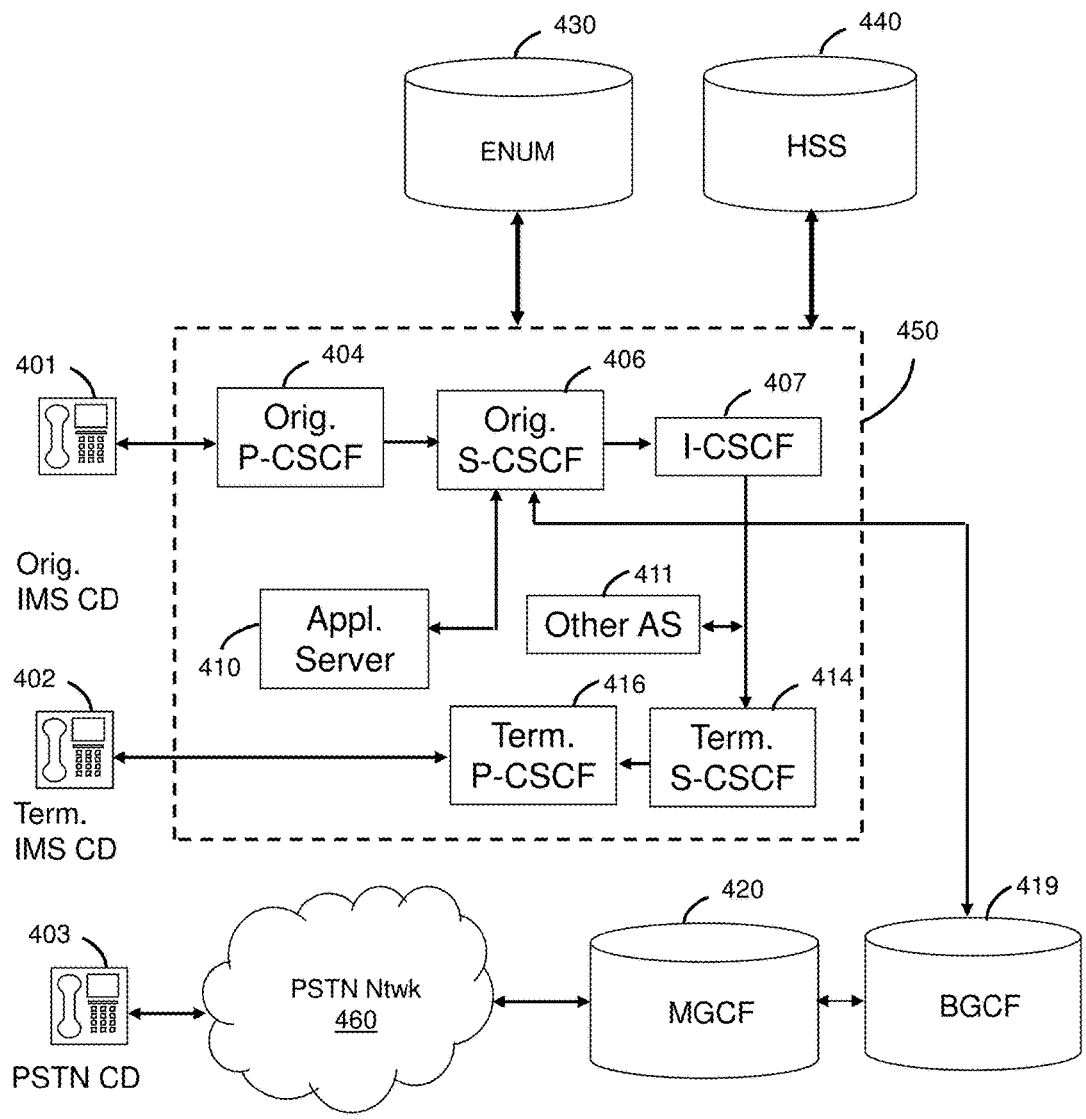

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (such as *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

Figure 5:
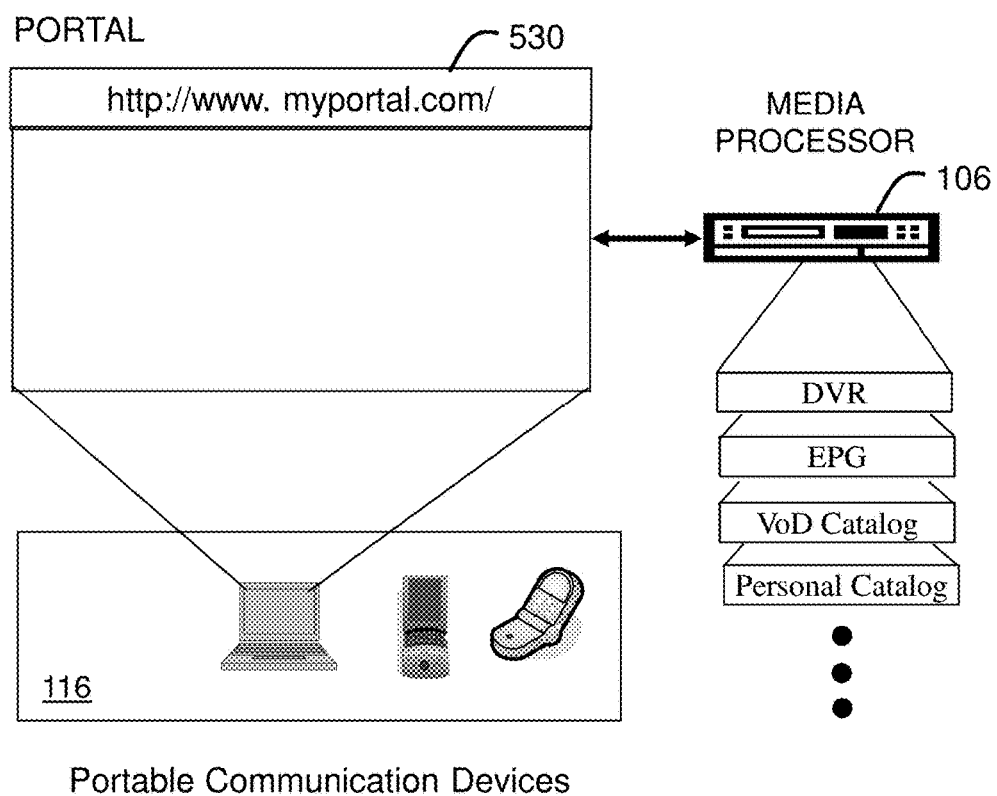
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog (such as personal videos, pictures, audio recordings, etc.) stored in the STB, a personal computer or server in a user's home or office, and so on.

Figure 6:
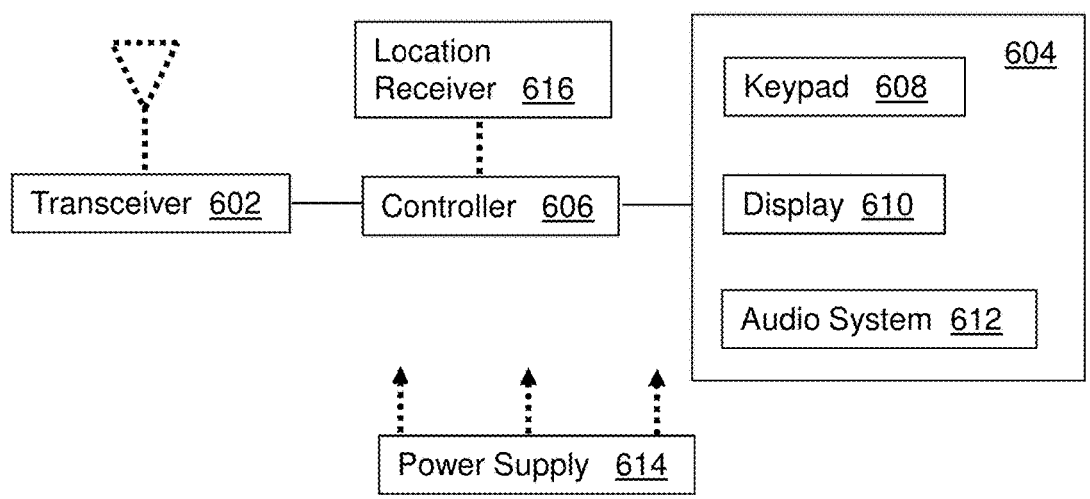
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, a location receiver 616, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (such as a USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (such as audio heard only in the proximity of a human ear) and high volume audio (such as speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. In one embodiment, the device 600 can be a battery-operated mobile multi-mode device. The location receiver 616 utilize common location technology such as a global positioning system (GPS) receiver for identifying a location of the communication device 100, thereby facilitating common location services such as navigation. The controller 606 can utilize computing technologies such as a microprocessor and/or digital signal processor (DSP) with associated storage memory such a Flash, ROM, RAM, SRAM, DRAM or other storage technologies.

Figure 7:
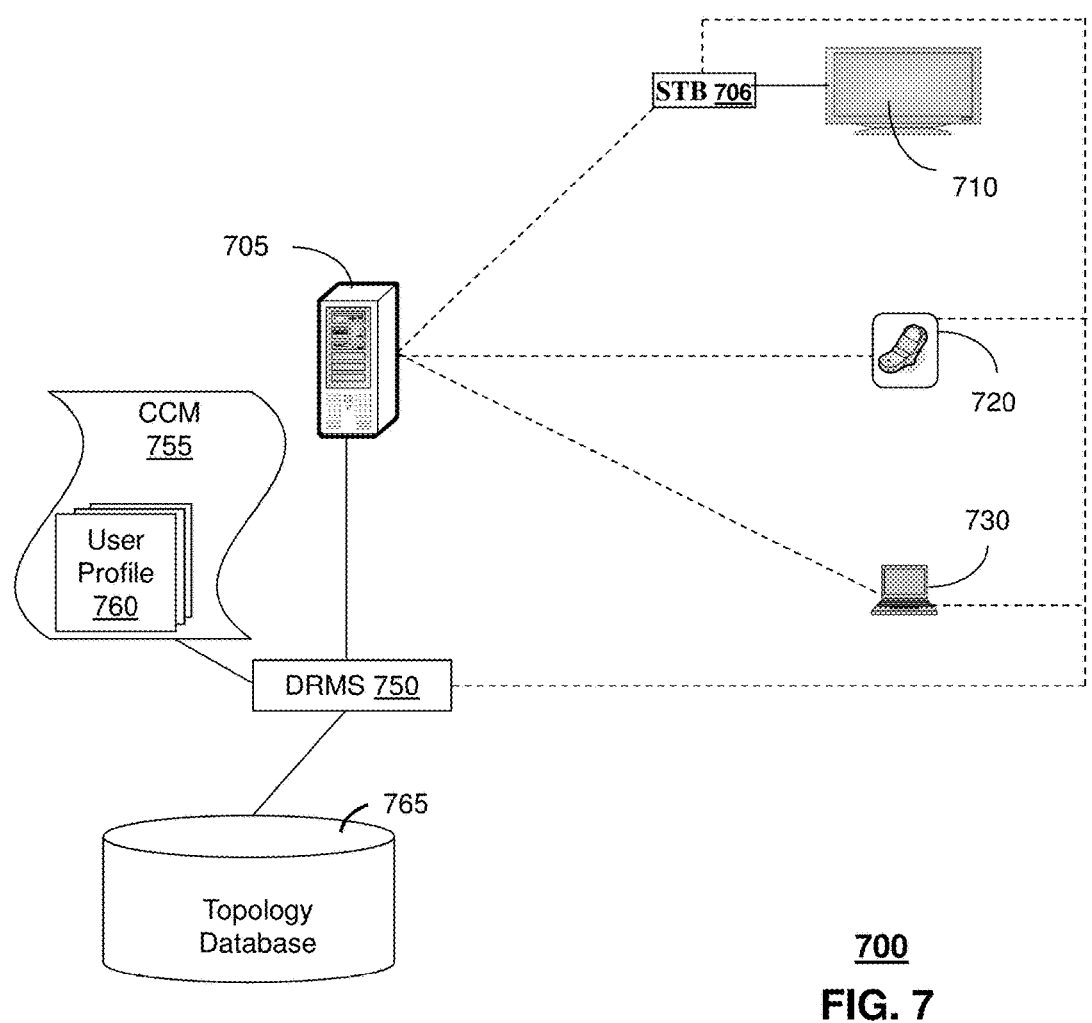
FIG. 7 depicts an illustrative embodiment of a communication system that provides media services.

FIG. 7 depicts an exemplary embodiment of a communication system 700 for delivering media content to communication devices associated with a user. The communication system 700 can represent an IPTV broadcast media system with multiple user display devices. Communication system 700 can be overlaid or operably coupled with communication systems 100-400 as another representative embodiment of said communication systems.

System 700 can include a network, such as ISP network 132 of FIG. 1, for delivery of the media content between the provider equipment (such as located at the video head office) and the customer's equipment, such as the gateway located at a residence. This exemplary embodiment shows a media server 705 for delivery of the media content to a plurality of communication devices, such as STB 706 having display device 710, mobile device 720, and desktop computer 730, which are associated with a user and/or a user group. The present disclosure contemplates various components and configurations being utilized for the delivery of media content, including centralized or distributed configurations. A number of network devices, including Ethernet switches, DSLAMs and other access devices can be utilized for transmitting the media content from the media server 705 to the communication devices 706, 720, 730. The media server 705 can utilize a number of connection structures for providing a communication link with the communication devices 706, 720, 730, including twisted pair lines, fiber lines and/or wireless connections. For example, a fiber optic coupling can include one GigE and ten GigE links connected to a fiber optic ring, such as a reconfigurable optical add-drop multiplexer (ROADM), which provide media services to a residence via a VHO comprising the media server 705. A portion of the communication devices of the user can receive media content using communication protocols that are different from another portion of the devices, such as a mobile cell phone that receives a video by way of WiFi protocol and a set top box that receives the video by way of a DSL protocol.

System 700 can include a Digital Rights Management System (DRMS) 750 operably connected to the server 705. The DRMS 750 can be in communication with one or more of the communication devices 706, 720, 730 directly and/or through the media server 705. The DRMS 750 or portions thereof can be in communication with the media server 705 and/or portions of the network by way of wired and/or wireless links. The DRMS 750 can include, or otherwise have access to, a Content Capability Matrix 755 having content rights parameters.

The present disclosure contemplates that various components of system 700 can be separate components or one or more of these components can be incorporated together, such as the media server 705 being part of the DRMS 750, including running an application thereon that includes, or otherwise has access to, the CCM 755. The present disclosure also contemplates other configurations for communication between the DRMS 750 and the media server 705 including a decentralized system and/or a master-slave arrangement between intermediary communication devices coupling the media server with the DRMS.

In one embodiment, the CCM 755 can define or otherwise provide information that allows for the propagation of a user's rights to media content, such as based on the access channel being utilized. The CCM 755 can be provisioned and specified by the DRMS 750, such as a Content Rights Server application, and can be used to communicate various user's rights associated with the media content. User profiles 760 for individual users or for groups of users can be maintained and updated which includes various information associated with the user and his or her communication devices, including identification, presence, preferences, purchases, usage history and so forth.

In one embodiment, the CCM 755 can specify rights as follows for a particular media content for a designated user: displayable, previewable, purchaseable, and/or consumeable rights. In another embodiment, the CCM 755 can specify the purchased state of the media content for a specific user. In another embodiment, system 700 provides for a three screen client application (such as web portal, TV, mobile/cell phone, PMP) that utilizes the CCM 755 to regulate the user's right to display (such as based on the displayable attribute), sample (such as based on the previewable attribute), purchase (such as based on the purchaseable attribute) and consume (such as based on the consumeable attribute) a particular media content (such as VoD, ringtone) or a portion thereof on specific access channels (such as Web portal, TV, mobile/cell phone, PMP).

System 700 can provide for specifying and enforcing content rights across multi-screen applications, such as through use of the CCM 755. In one embodiment, the CCM 755 can be a multi-dimensional model used to propagate rights associated with the media content, enabling the client applications to enforce access rights to the content appropriately. The consumable rights attribute can be utilized for enforcing the user's entitlement to playback or consume the content on a particular platform (Web, TV, mobile/cell phone, PMP). In one embodiment, media content can be encoded/formatted to play on certain mediums, and the consumeable rights attribute enforces that limitation. The purchaseable rights attribute can regulate the user's ability to purchase the content based on the medium (such as web-only purchaseable content). The displayable rights attribute can regulate the ability to render or present the content to the user. For example, community standards/regulatory rules may disallow presentation of adult content on the TV in certain U.S. geographical areas. Using the displayable rights attribute, media content can be rendered or masked based on the access medium. The previewable attribute can regulate the user's ability to playback samples of the content (such as trailers/sneak previews for VoDs, previews of ringtones). The purchased state attribute or flag can provide to the three screen client application, the current purchase state (such as purchased on TV) of the media content. All of the attributes combined in the CCM 755 can be used to regulate access, control and rights to three screen content across the Web, TV, mobile/cell phone and PMP access channels.

In one embodiment, the DRMS 750 can be in communication with and/or can be integral with a topology database 765 that includes information related to the topology of the network. For example, the topology database can be utilized for monitoring the dynamic nature of the network topology, such as through retrieving topology database from each of the network elements at various time frames, including at the time of going on-line or in anticipation of going off-line. The topology information can be utilized in combination with presence information associated with the communication devices 706, 720, 730 for determining local restrictions of viewing content and so forth.

Figure 8:
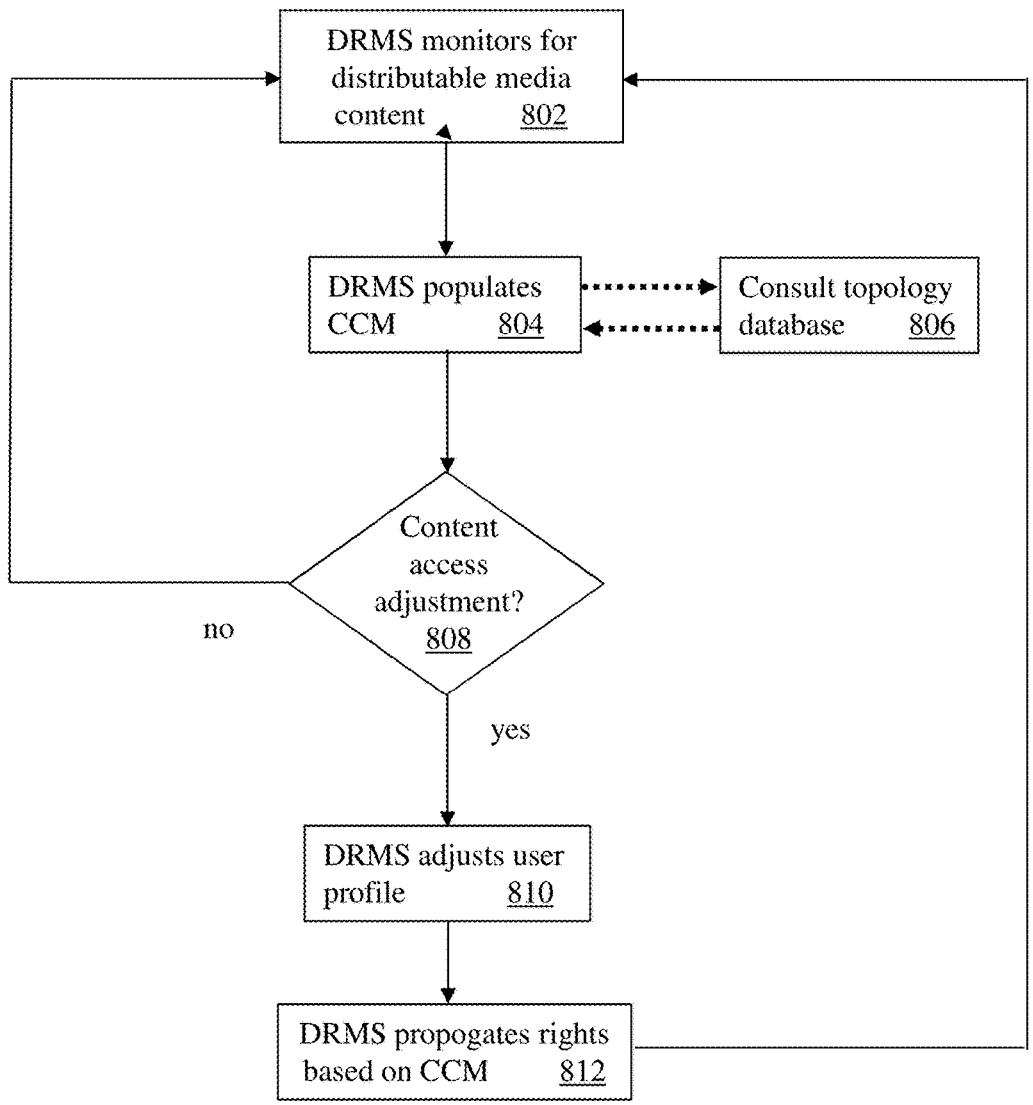
FIG. 8 depicts an illustrative embodiment of a method operating in portions of the communication systems of FIGS. 1-4 and 7.

FIG. 8 depicts an exemplary method 800 operating in portions of the communication systems 100, 200, 300, 400, and/or 700. Method 800 has variants as depicted by the dashed lines. It would be apparent to an artisan with ordinary skill in the art that other embodiments not depicted in FIG. 8 are possible without departing from the scope of the claims described below.

Method 800 can begin with step 802 in which the DRMS 750 monitors for distributable media content. For example, the VHO can receive new media content, including VoD and so forth. The DRMS 750 can receive a notification of the media content, including identification information and content parameters, such as distribution rights, rating, and so forth. The monitoring can be performed using a number of techniques, including polling by the DRMS 750 of media content sources. The media content can be from various sources and be of various forms, including limited distribution content, such as home videos or audio recordings and so forth. In step 804, the DRMS 750 can populate or otherwise update the CCM 755 based on the new media content. The CCM can include various information associated with the media content including the attributes of displayable, previewable, purchaseable, consumeable and/or purchased state for a designated user. In one embodiment in step 806, the DRMS 750 can access, or otherwise obtain information from, a topology database associated with the designated user. For instance, the topology database can include local restrictions on displaying media content and can include presence and/or location information associated with the user's communication device so that enforcement of the displayable attribute can be facilitated.

In step 808, the DRMS 750 can determine if an access adjustment associated with media content has been made by a user. If an access adjustment is being made then method 800 can proceed to step 810 for adjusting a user profile associated with the user, otherwise the method can return to step 802 to monitor for new distributable media content. The access adjustment can be various types that are associated with a user accessing media content. For instance, the DRMS 750 can determine if a user has purchased media content, such as VoD, and can further determine the particular communication device or platform through which the user made the purchase. As another example, the DRMS can determine whether a user is attempting to access media content, such as a movie that has been recorded on a DVR, and can further determine the particular communication device or platform the user is utilizing for the access. The user profile adjustment can indicate the status of access to particular media content, such as when it was purchased, what device was used, any limitations on distribution due to the purchase option chosen (such as purchasing a limited distribution copy at a lower price that only allows display on a single communication device of the user).

In step 812, the DRSM can propagate Distribution Right Control (DRC) data to one or more of the communication devices associated with the user based on the attributes of the CCM 755 and the user profile 760. The DRC data can be propagated to the communication devices when the communication devices seek to display or otherwise present the media content so that the attributes associated with the media content can be enforced. The DRC data can be various types that provide control over presentation of the media content by the communication device, including control instructions for presenting the media content, encryption keys or other information that allows for presentation of the media content and so forth.

The consumable rights attribute can be utilized for enforcing the user's entitlement to playback or consume the content on a particular platform. In one embodiment, media content can be encoded/formatted to play on certain mediums, and the consumeable rights attribute enforces that limitation. The purchaseable rights attribute can regulate the user's ability to purchase the content based on the medium. The displayable rights attribute can regulate the ability to render or present the content to the user, such as based on location, time of day, and so forth. Using the displayable rights attribute, media content can be rendered or masked based on the access medium. The previewable attribute can regulate the user's ability to playback samples of the content.

In one embodiment, the purchase state can be utilized for adjusting the access procedure for a user. For instance, the DRMS 750 can determine from the CCM 755 if the media content has been purchased based on the purchase state, and the "play" button can be presented when the purchase has been made. In another embodiment, if the media content was purchased through a web interface then the distribution can be device or protocol limited, such as to presentation using IPTV protocol.

From the foregoing descriptions, it would be evident to an artisan with ordinary skill in the art that the aforementioned embodiments can be modified, reduced, or enhanced without departing from the scope and spirit of the claims described below. In one embodiment, the previewable material can be adjustable. For example, certain portions of the preview, such as adult content, can be masked based on location of the communication device, time of day, and so forth. In another embodiment, the displayable attribute can be modified to limit display to particular communication devices of the user based on the location of the user. For instance, where a media source desires limited distribution of media content in a designated geographical region, the DRMS 750 can use the displayable attribute to limit display to a single communication device of the user including a single type of platform (such as TV) when the user communication devices are within the region and can allow for display on other communication devices when those devices are outside of the region.

These are but a few examples of the modifications that can be applied to the present disclosure without departing from the scope of the claims. Accordingly, the reader is directed to the claims for a fuller understanding of the breadth and scope of the present disclosure.

Other suitable modifications can be applied to the present disclosure without departing from the scope of the claims below. Accordingly, the reader is directed to the claims section for a fuller understanding of the breadth and scope of the present disclosure.

Figure 9:
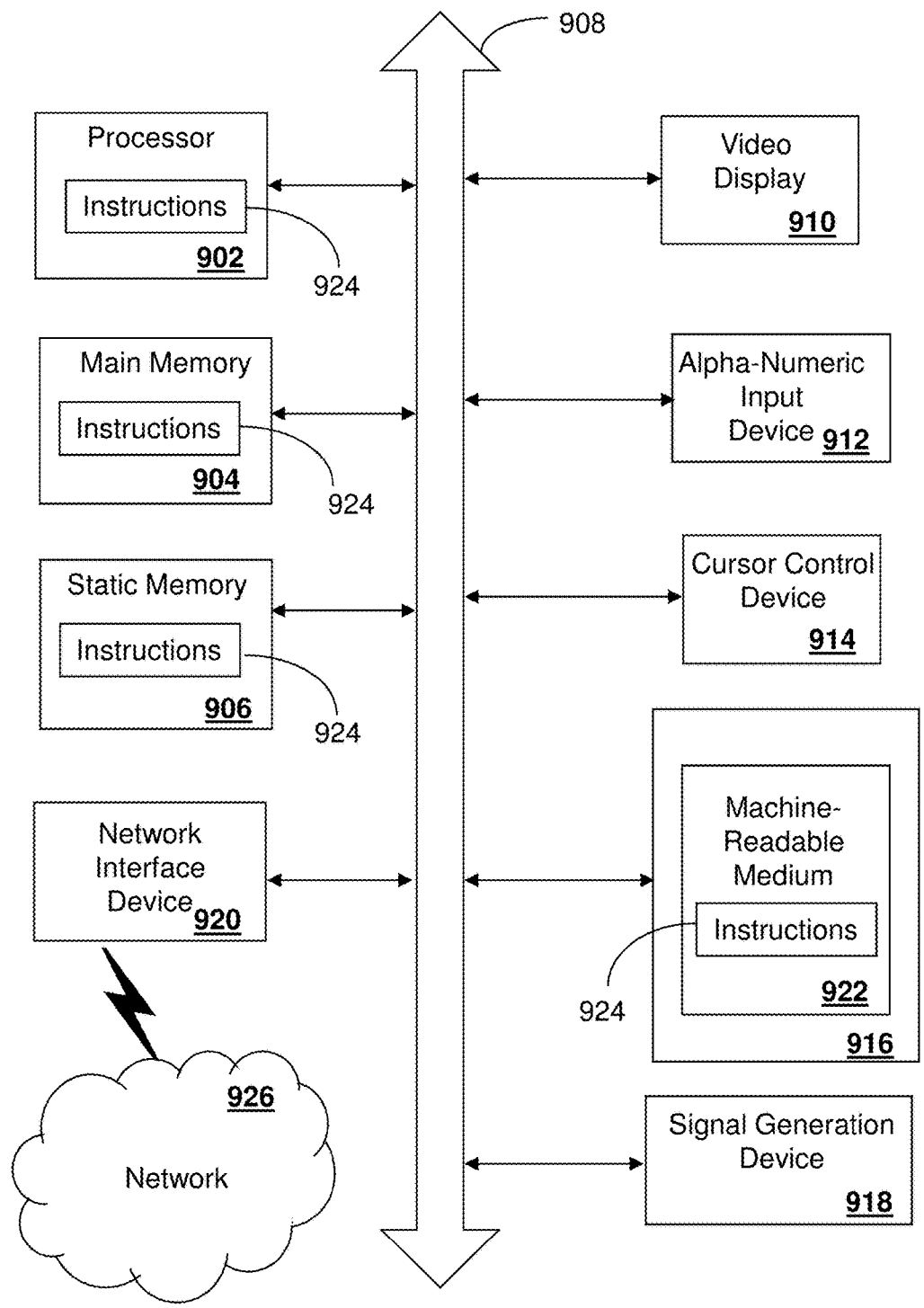
FIG. 9 is a diagrammatic representation of a machine in the form of a computer system within which a set of instructions, when executed, may cause the machine to perform any one or more of the methodologies discussed herein.

FIG. 9 depicts an illustrative diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (such as a central processing unit (CPU)), a graphics processing unit (GPU, or both), a main memory 904 and a static memory 906, which communicate with each other via a bus 908. The computer system 900 may further include a video display unit 910 (such as a liquid crystal display (LCD)), a flat panel, a solid state display, or a cathode ray tube (CRT)). The computer system 900 may include an input device 912 (such as a keyboard), a cursor control device 914 (such as a mouse), a disk drive unit 916, a signal generation device 918 (such as a speaker or remote control) and a network interface device 920.

The disk drive unit 916 may include a computer-readable medium 922 on which is stored one or more sets of instructions (such as software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the computer-readable medium 922 is shown in an example embodiment to be a single medium, the term "computer-readable medium" should be taken to include a single medium or multiple media (such as a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   monitoring, by a system comprising a processor, for media content that is distributable, the monitoring comprising polling media content sources communicating with the system via a network, wherein the media content is adapted for distribution to a communication device of a user, wherein the media content has content rights parameters associated therewith for limiting distribution of the media content;
   generating, by the system, rights control data based on the content rights parameters;
   detecting, by the system, an attempt to access the media content by the communication device; and
   transmitting, by the system, the rights control data over the network to the communication device to control a presentation of the media content at the communication device,
   wherein the content rights parameters are adapted to limit the presentation of the media content based on a time of day, a location of the communication device, a location of the user, or a combination thereof.

2. The method of claim 1, further comprising accessing a topology database including topology information regarding the network, to obtain location information regarding the location of the communication device or the location of the user.

3. The method of claim 2, wherein the location information comprises local restrictions on the presentation of the media content.

4. The method of claim 1, further comprising propagating the rights control data to a plurality of communication devices coupled to the network and associated with the user.

5. The method of claim 1, wherein the rights control data comprises presentation rights for the presentation of the media content at the communication device based on the content rights parameters and the location of the communication device, wherein the presentation of the media content at the communication device includes a masked portion, and wherein the portion of the presentation is masked based on the location of the communication device, a local content policy associated with the location, and the presentation rights.

6. The method of claim 1, further comprising updating a user profile associated with the user, responsive to detecting the attempt to access the media content.

7. The method of claim 1, further comprising:
   provisioning a content capability matrix with the content rights parameters; and
   updating the content capability matrix based on new media content identified by the monitoring.

8. The method of claim 7, wherein the content capability matrix comprises specific rights for the user and a purchased state of the media content for the user, the specific rights comprising displayable rights, previewable rights, purchaseable rights, consumeable rights, or any combination thereof.

9. The method of claim 1, further comprising adjusting the content rights parameters based on a purchase of the media content by the user.

10. The method of claim 1, wherein the distribution of the media content to the communication device is limited in accordance with a type of communication protocol utilized by the communication device.

11. A device comprising:
    a processor; and
    a memory that stores executable instructions that, when executed by the processor, facilitate performance of operations comprising:
    monitoring for distributable media content by polling a plurality of media content sources communicating with the device via a network, wherein the media content is adapted for distribution to a user communication device, wherein the media content has content rights parameters associated therewith for limiting distribution of the media content;

provisioning a content capability matrix with the content rights parameters;

generating rights control data based on the content rights parameters;

detecting an attempt to access the media content by the user communication device;

updating a user profile associated with the user; and transmitting the rights control data to the user communication device to control a presentation of the media content at the user communication device, wherein the content rights parameters are adapted to limit the presentation of the media content based on a time of day, a location of the user communication device, a location of the user, or a combination thereof.

12. The device of claim 11, wherein the operations further comprise propagating the rights control data over the network to a plurality of user communication devices.

13. The device of claim 11, wherein the operations further comprise updating the content capability matrix based on new media content identified by the monitoring.

14. The device of claim 11, wherein the presentation of the media content at the user communication device includes a masked portion.

15. The device of claim 11, wherein the content capability matrix comprises specific rights for the user and a purchased state of the media content for the user, the specific rights comprising displayable rights, previewable rights, purchaseable rights, consumeable rights, or any combination thereof.

16. The device of claim 15, wherein the operations further comprise adjusting the content rights parameters based on a purchase of the media content by the user.

17. A machine-readable storage medium comprising executable instructions that, when executed by a processor, facilitate performance of operations comprising:

monitoring for distributable media content by polling a plurality of media content sources communicating with the processor via a network, wherein the media content is adapted for distribution to a communication device of a user, wherein the media content has content rights parameters associated therewith for limiting distribution of the media content;

provisioning a content capability matrix with the content rights parameters;

generating rights control data based on the content rights parameters;

detecting an attempt to access the media content by the communication device; and transmitting the rights control data to the communication device to control a presentation of the media content at the communication device, wherein the content rights parameters are adapted to limit the presentation of the media content based on a time of day, a location of the communication device, a location of the user, or a combination thereof.

18. The machine-readable storage medium of claim 17, wherein the operations further comprise accessing a topology database including topology information regarding the network, to obtain location information regarding the location of the communication device or the location of the user.

19. The machine-readable storage medium of claim 17, wherein the operations further comprise updating a user profile associated with the user, responsive to detecting the attempt to access the media content.

20. The machine-readable storage medium of claim 17, wherein the content capability matrix comprises specific rights for the user and a purchased state of the media content for the user, the specific rights comprising displayable rights, previewable rights, purchaseable rights, consumeable rights, or any combination thereof.

* * * * *